United States Patent [19]
Campfield

[11] Patent Number: 5,614,046
[45] Date of Patent: *Mar. 25, 1997

[54] GLASS REPAIR METHOD

[75] Inventor: Richard A. Campfield, Riverside, Calif.

[73] Assignee: Ultra Bond Licensing Corporation, Grand Junction, Colo.

[*] Notice: The portion of the term of this patent subsequent to Nov. 19, 2013, has been disclaimed.

[21] Appl. No.: 436,155

[22] Filed: May 8, 1995

Related U.S. Application Data

[63] Continuation of Ser. No. 155,452, Nov. 19, 1993, Pat. No. 5,425,827, which is a continuation-in-part of Ser. No. 881,625, May 12, 1992, Pat. No. 5,429,692, which is a continuation-in-part of Ser. No. 580,075, Sep. 10, 1990, Pat. No. 5,116,441.

[51] Int. Cl.$^6$ .................................................. B32B 35/00
[52] U.S. Cl. .............................. 156/94; 425/12; 425/13; 264/36
[58] Field of Search ............................... 156/94; 425/11, 425/12, 13; 264/36

[56] References Cited

U.S. PATENT DOCUMENTS

| | | | |
|---|---|---|---|
| 5,116,441 | 5/1992 | Campfield | 156/94 |
| 5,425,827 | 6/1995 | Campfield | 156/94 |
| 5,429,692 | 7/1995 | Campfield | 156/94 |

OTHER PUBLICATIONS

Glas–Weld News Breaks, Aug. 1984, Bend, Oregon.
Glas–Weld News Breaks, Apr. 1989, Bend, Oregon.
Glas–Weld News Breaks, Jul. 1989, Bend, Oregon.

*Primary Examiner*—Mark A. Osele
*Attorney, Agent, or Firm*—Lawrence S. Cohen; Freilich, Hornbaker & Rosen

[57] ABSTRACT

A method of repairing a crack in a windshield where the crack has a surfaced portion repair resin of a first viscosity is applied to the crack and then a second higher viscosity repair resin is applied over the same portion of the crack. In an alternative method where the crack has an unsurfaced or tight portion, two injectors are used to fill that portion with a lower viscosity resin.

4 Claims, 8 Drawing Sheets

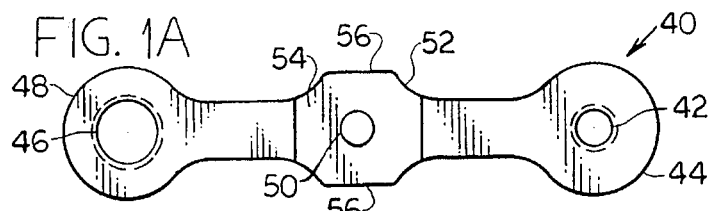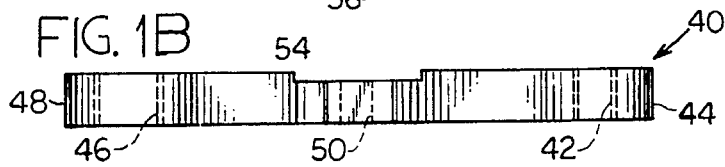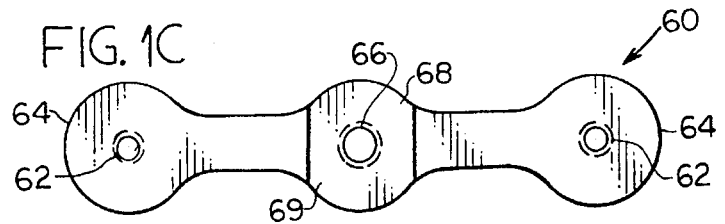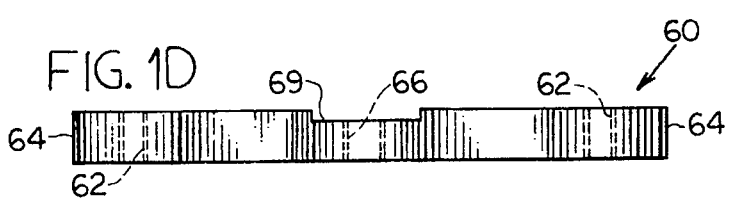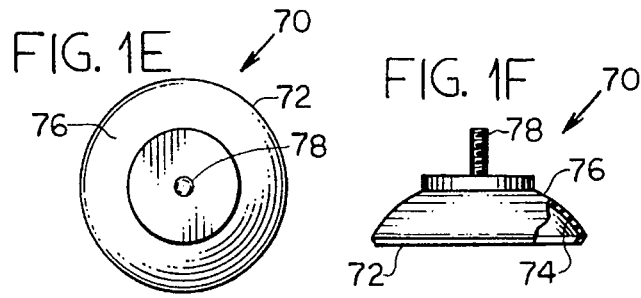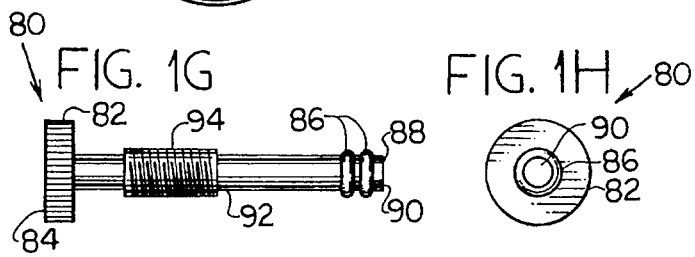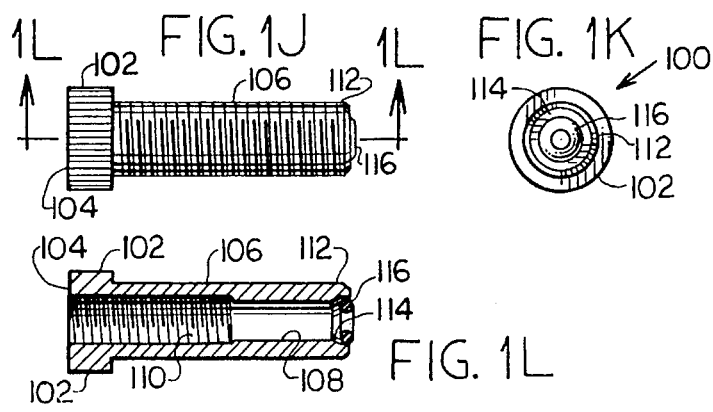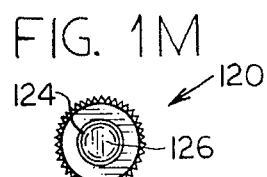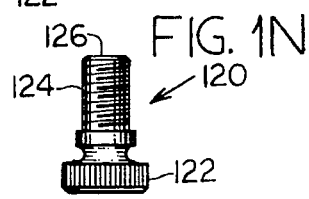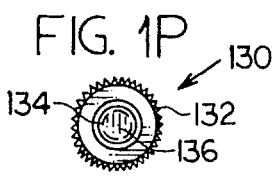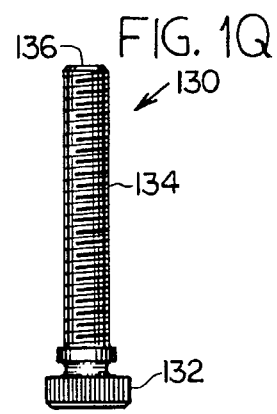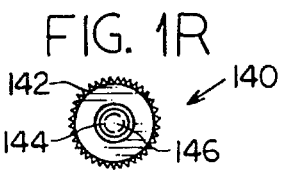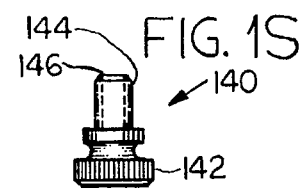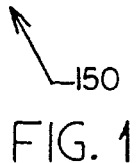

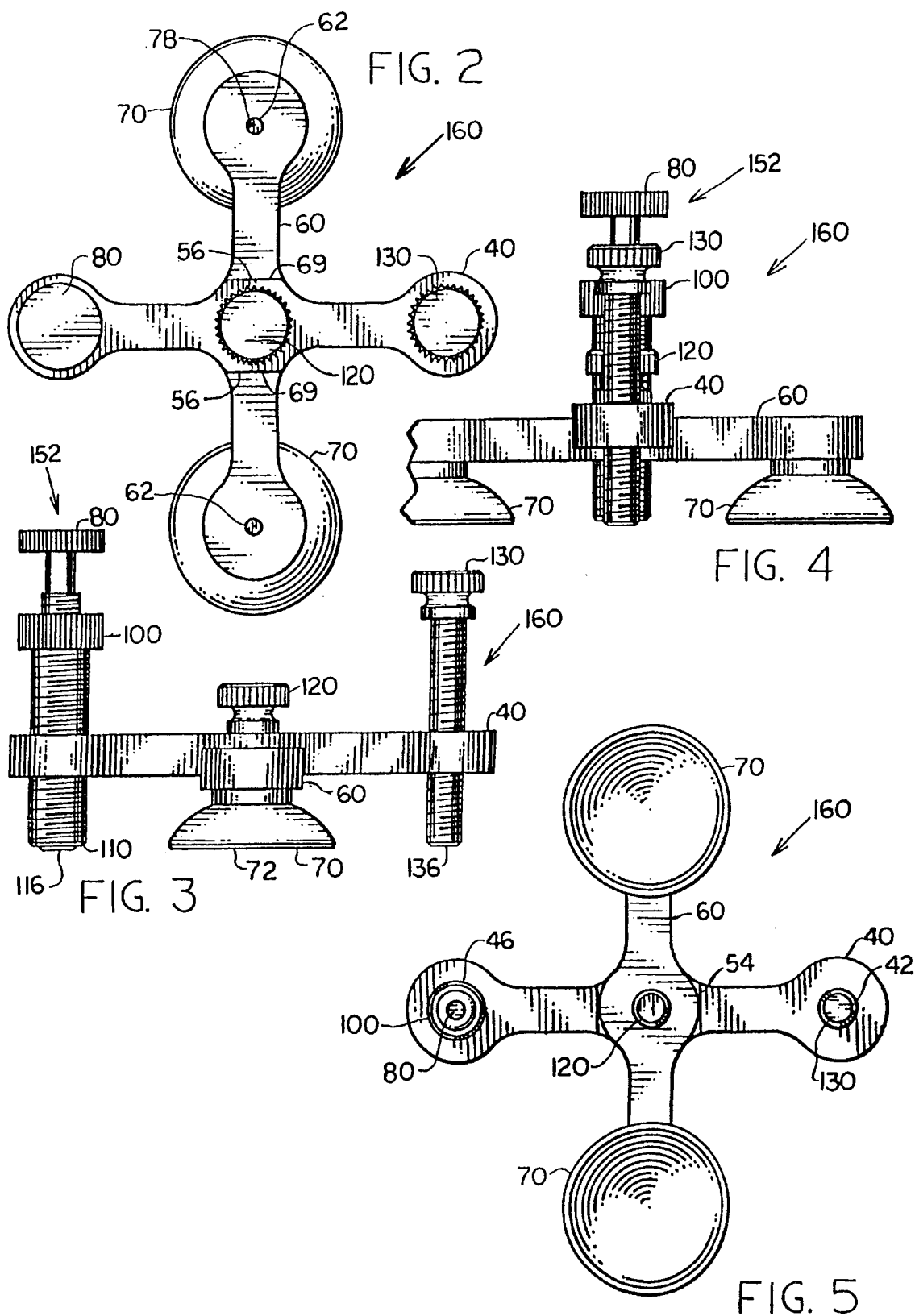

GLASS REPAIR METHOD

REFERENCE TO RELATED APPLICATIONS

This patent is a continuation of patent application Ser. No. 08/155,452 filed Nov. 19, 1993 now U.S. Pat. No. 5,425,827 which is a continuation-in-part of patent application Ser. No. 07/881,625 filed on May 12, 1992 now U.S. Pat. No. 5,429,692 which is a continuation-in-part of application Ser. No. 07/580,075 filed Sep. 10, 1990 now U.S. Pat. No. 5,116,441 issued on May 12, 1992. The disclosures of the prior applications and patents are hereby incorporated by reference in their entirety into this application.

TECHNICAL FIELD

The present invention pertains to glass crack repair, and more particularly, to repair, in place, of automobile windshield cracks.

BACKGROUND ART

Various resin products are commercially available in the trade for the repair of glass cracks and, in particular, the repair of automobile windshield cracks. Such repair may be done in place without removal of the windshield and saves the cost of windshield replacement. The practicality of an acceptable glass crack repair is principally due to the fact that the index of refraction of the resin is substantially the same as that of the glass.

A crack in glass is visible because as light rays pass the boundary between the glass and the air in the crack they are bent due to the difference in the speed of light in glass as compared with the speed in air. Light that is reflected back from such boundaries comes at a different angle than if there were no crack and hence the eyes and brain of the observer sense the discontinuity. Index of refraction for any material is a ratio of the speed of light in that material compared to the speed in a vacuum. If two materials have the same index of refraction there will be no bending of the light rays at a boundary between the materials and an observer will not sense the discontinuity. Thus a crack filled with such a resin will essentially seem to disappear.

There are different formulations of resins. Some are aerobic or "air drying" and others are cured or hardened by radiating them with ultraviolet light which is usually provided by a lamp made for this purpose. The aerobic resins come in two parts and are mixed before use. Their curing begins from the time of mixing whereas the cure of the ultraviolet types begins when they are subjected to the ultraviolet light.

Automobile windshields are typically made of a "sandwich" of two layers of glass laminated to an inner layer of resin material such as polybutyral. The windshield has a periphery which defines a glass area within the periphery for each glass layer. The glass area for each layer has an exposed outer surface and an inner surface in contact with the inner plastic (polybutyral) layer. Also, for each glass layer there is an edge defined by the periphery extending between the outer surface and the inner surface joining these surfaces at an angle such as 90° to form a corner. Many types of breaks may occur in such windshields. One, which is usually caused by the impact of a rock, is called a "bullseye". A bullseye is a type of a stone break which has a circular appearance. It often has a cone shaped piece of glass detached from the outer layer. The apex of the cone faces the outer surface and the base of the cone may be forced partly into the inner layer. The apex may or may not connect to the outer atmosphere.

Sometimes the impact of a rock or other object will result in small radiating cracks from the impact point and is then called a "star break". A combination of a bullseye and a star, called a "combination break", can also occur. Impacts often cause linear cracks in windshields. They may originate at a stone break or may, instead, originate at a point. They may extend to the glass edge or they may terminate at another point.

Various tools have been proposed to aid in filling stone breaks with resin. One is described in U.S. Pat. No. 3,993,520 to Werner and utilizes an injector assembly having a piston inside a cylinder. When the piston is depressed the resin is injected out the open end of the cylinder and into the stone break. The assembly is held to the surface of the glass by suction cups.

A similar apparatus with an adjustable arm is disclosed in U.S. Pat. No. 4,291,866 to Petersen. A variation of the Werner apparatus is in U.S. Pat. No. 4,569,808 to Small while U.S. Pat. No. 4,744,841 to Thomas utilizes vibration and heat. An apparatus with a spring loaded air exit is disclosed in U.S. Pat. No. 4,775,305 to Alexander and U.S. Pat. No. 4,814,185 to Jones has a side tube for introduction of the resin. The use of vacuum to aid the resin injection is explored in U.S. Pat. No. 4,820,148 to Anderson and U.S. Pat. No. 4,919,602 to Janszen. Other related patents are U.S. Pat. No. 4,419,305 to Matles and U.S. Pat. No. 4,385,879 to Wilkinson.

There are windshield repair apparatus of a number of different designs. In each case the objective has been to repair a stone-break by use of vacuum and injection of resin. One type of system uses air pumps and compressors. However, the simplest type of system is a piston and cylinder arrangement. For example in the Werner patent U.S. Pat. No. 3,993,520 mentioned above, an injector is described which has an outer housing with an interior recess in which a rubber sleeve is mounted. The rubber sleeve is taught to be used to seal against the windshield for desired sealing by means of a protruding end portion. The injector also has a pressure screw which is inserted inside the housing. Inside the housing are threads which mate with threads fin the pressure screw. Also, the pressure screw as a plunger end that fits the sleeve. Both the housing and the pressure screw have knurled handles, the first for setting up the apparatus, the second for injecting resin in the break.

For a normal bullseye type stone-break approximately 1 cc of resin is needed, according to the Werner patent. This is equivalent to 3–4 drops of resin, an amount sufficient to repair most stone breaks.

The piston-cylinder injectors of which the one shown in the Werner patent is typical have a number of deficiencies. Most importantly, while they are adequate for stone break repair; they are deficient for long crack repair, primarily because they do not hold enough resin. Also, they are susceptible to loosing seal when the piston is backed-off too far; and they are difficult to manipulate with the ease and precision desired for long crack repair.

As far as is known, the background art discussed above was designed for stone breaks rather than long cracks (over six inches). Short cracks are seen as small dots on the surface of the glass, or as a bullseye, a star-break, a combination bullseye and star break, and sometimes as variants on these configurations. It is well known that stone breaks are "unsurfaced" that is they extend below the surface of the glass; or if they do extend to the surface they are so tight that they must be treated as unsurfaced when being repaired. Thus the prior repair methods and equipment employ application of vacuum at an entry location which is the impact spot which caused the damage, followed by injection of resin under pressure to flow into the crack. This is called "stone damage art". In this manner the resin replaces the air in the crack. However, stone damage art cannot be used to repair cracks which are "surfaced", that is where the crack is open at the surface of the glass. Such cracks have been consistently referred to in the art as over 6 inches in length. There has been an inability to effectively repair cracks over 6 inches, and a long felt need for a method and equipment to do so. Stone damage art employs resin viscosity normally in the range of 10–30 c.p.s., but not exceeding about 50 c.p.s. In general the viscosity must be low enough to easily flow in the tight cracks around a stone break. Thus a thin watery viscosity has been desired.

Most such long cracks have an end which terminates at a location on the glass area which is neither the edge nor the point of impact. This termination location is called a "point". The point itself is very tight and locally may be unsurfaced. Further most such long cracks will extend from a point to the edge of the glass with an impact location intermediate these ends. Other such long cracks will radiate from an impact location to the glass edge or to a point. Frequently the crack will extend in two opposite directions from an impact point, ending in a point in one direction and at an edge in the other direction. Some cracks terminate at a point at each end. Sometimes a Y formation will appear. A surfaced crack will usually be unsurfaced immediately proximate a point.

Various resins have been in use and introduced in the field of windshield repair from the early 1970's. Most of the resins, as noted above were designed to repair stone breaks and were of low viscosity. Resins up to about 90 c.p.s. were recommended for use in hot weather, although this implies a much lower viscosity when applied to a repair as heat dramatically reduces viscosity. Over about 18 years, despite some attempts to do so the repair of cracks over 6 inches in length was generally considered unsuccessful, and was disclaimed or discouraged. Therefore, crack repair was limited to 6 inches until introduction by Ultra Bond, Inc. of the method disclosed in U.S. Pat. No. 5,116,441 of which the present patent is a continuation-in-part (through an intermediate application).

Although in general it has been understood as explained herein that as high viscosity as possible should be used in the various portions of a long crack, there is a disadvantage in using very high viscosities in that the resistance to flow challenges the skills of the technicians and presents difficulty in the presently available insertion equipment. For example, while one end of a crack may call for 20–60 c.p.s. resin, the other end may call for 4,000 c.p.s. An exemplary gel type resin has 20,000 c.p.s. viscosity. Therefore, there is a need to determine the available range of viscosity, in effect while it is generally the goal to use the highESt viscosity possible, in each portion of the crack, it has now been found that there is lower limit to the viscosity which can be successfully used. Thus a higher viscosity should be used as specified herein, but the lowest viscosity which will work should be selected.

DISCLOSURE OF THE INVENTION

In accordance with an embodiment of the present invention, a kit is disclosed having bars, suction cups, pressure bolts, nuts and an injector assembly. The injector assembly has a piston operating in a cylinder. The piston has O rings that effect a seal with the cylinder walls. The cylinder is used to hold the resin and has an O ring at its lower end which bears upon the glass. The parts of the kit may be assembled into three glass repair tools.

The first is a repair bridge tool. This tool has two suction cups for holding a frame, made of two bars, on the glass. It has an injector assembly for injecting resin into the glass crack and it has a nylon pressure bolt which, in conjunction with the vacuum cups, holds the injector assembly O ring firmly against the glass. The piston may be rotated away from the glass to create a vacuum for removal of air from a crack or it may be rotated towards the glass to exert pressure on the resin. The pressure causes the resin to flow into the crack.

A second tool which may be assembled from the kit is the crack opener. The crack opener has a bar, two suction cups and a pressure bolt. The suction cups hold the crack opener on the glass. The pressure bolt may then be rotated downward into contact with the glass. When used on the inner side of a windshield the crack opener causes the crack to open so that resin may be injected with the repair bridge.

A third tool, that may be assembled from the glass repair kit, is the repair bar tool. This tool is similar to the repair bridge except it has a simpler frame of a single bar. The repair bar may also be used to remove air from a crack or inject resin into a crack. It may be used in conjunction with a repair bridge tool.

In accordance with an aspect of the present invention, methods of use of the glass repair kit are disclosed. One method is used to fill cracks in the outer glass layer of a windshield that extend from a point to the edge of the glass. A small bullseye is created at the point of the crack to relieve stress on the point. The bullseye is created by impacting the glass with a pointed object. A repair bridge is used to first vacuum air out of the bullseye and then to fill the bullseye with resin.

A crack opener reel is then installed on the inside of the glass to open the crack near the bullseye. The repair bridge may then be slid along the crack with the crack opener to the glass edge. The pressure on the resin in the injector assembly causes the resin to flow into the crack. The resin is covered with plastic tabs to contain it and irradiated with ultraviolet light to cure it, after which the plastic tabs may be removed.

In accordance with another aspect of the current invention a second method of use of the kit to fill a crack running from a point to the glass edge is disclosed. In this method of use the crack opener tool is employed to open the crack near the point. The repair bridge is then used to fill the crack with resin by starting at the glass edge and sliding towards the point. A bullseye is created by impact at the point after which the repair bridge is used to pull air from the bullseye and, finally, to fill the bullseye and the crack portion near the point with resin. The resin is retained and cured as before.

Two repair bridges are utilized in a third disclosed method of use. A bullseye is created by impacting the glass at the point of the crack with a pointed tool. One repair bridge is mounted over the bullseye and set so as to draw a vacuum on the bullseye. A crack opener tool is mounted on the inside of the glass near the bullseye to open the crack. A second repair bridge is employed to fill the crack with resin starting at the glass edge. The second repair bridge fills the crack as it is slid along the crack to near the bullseye. Finally the first repair bridge at the bullseye is set to exert pressure and inject resin into the bullseye and crack. The resin is retained and cured as before.

A fourth method of use of the repair kit is disclosed to fill a crack in the outer glass layer which extends from a first point to a second point rather than to the glass edge. Two crack opener tools are used near each point to open the crack. A repair bridge is employed to fill the crack from near the first point to near the second point. A bullseye is created at each point and the repair bridge is used to remove air from and insert resin into each bullseye in turn. The resin is retained and cured as before.

A further method has been discovered and is disclosed for selecting resins for use in different portions of long cracks. In particular there has been defined the various portions of cracks and the failure modes when the wrong resin is used. Further there has been determined the lowest viscosity which will work effectively in long cracks under various climate conditions.

In this method the viscosity of the resin has been determined to be the controlling variable. The lowest effective viscosity is defined.

The novel features of the invention are set forth with particularity in the appended claims. The invention will be best understood from the following description when read in conjunction with the accompanying drawings.

BRIEF DESCRIPTION OF THE DRAWINGS

Incorporated as part of the description, in order to illustrate embodiments and principles of the present invention, are the accompanying drawings, wherein:

FIG. 1 illustrates the elements of a glass repair kit;

FIG. 1A is a plan view of a first bar;

FIG. 1B is an elevation view of the first bar of FIG. 1A;

FIG. 1C is a plan view of a second bar;

FIG. 1D is an elevation view of the second bar of FIG. 1C;

FIG. 1E is a plan view of a suction cup;

FIG. 1F is an elevation view of the suction cup of FIG. 1E;

FIG. 1G is an elevation view of a piston;

FIG. 1H is a plan view of the piston of FIG. 1G;

FIG. 1J is an elevation view of a cylinder;

FIG. 1K is a plan view of the cylinder of FIG. 1J;

FIG. 1L is a view along the line 1L—1L of FIG. 1K;

FIG. 1M is a plan view of a bolt;

FIG. 1N is an elevation view of the bolt of FIG. 1M;

FIG. 1P is a plan view of a pressure bolt;

FIG. 1Q is an elevation view of the pressure bolt of FIG. 1P;

FIG. 1R is a plan view of a nut;

FIG. 1S is an elevation view of the nut of FIG. 1R;

FIG. 2 is a plan view of a repair bridge tool;

FIG. 3 is a front elevation view of the repair bridge tool of FIG. 2;

FIG. 4 is a side elevation view of the repair bridge tool of FIG. 2;

FIG. 5 is a bottom plan view of the repair bridge tool of FIG. 2;

FIG. 14A illustrates a crack in the outer glass layer of a windshield;

FIG. 14B illustrates a hole drilled at the point of the crack of FIG. 14A;

FIG. 14C illustrates tapping a bullseye in the hole of FIG. 14B;

FIG. 14D illustrates the bullseye created at the point of the crack in FIG. 14C;

MODES FOR CARRYING OUT THE INVENTION

Figure 6:
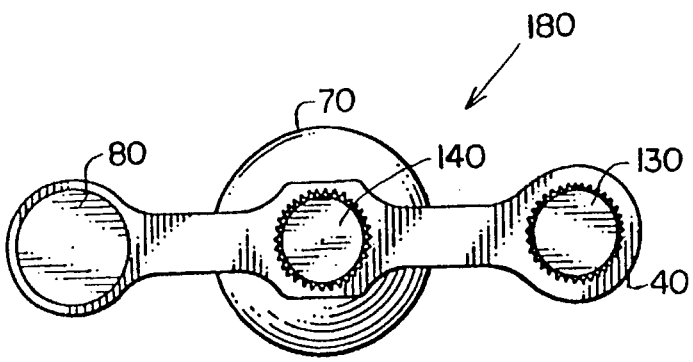
FIG. 6 is a plan view of a repair bar tool.

In accordance with an embodiment of the present invention, a kit 150 is illustrated in FIG. 1 for the assembly of glass crack repair tools. With the parts shown a repairman can quickly assemble the glass crack repair tools needed for a crack repair. When the repair is concluded the parts can be disassembled and stored in a tool case or other convenient carrier for transportation to the next job. It may be desirable for some repair tasks to have available more than one of some of the parts of the kit 150. The exact number will depend upon the tools that one wishes to assemble. The parts of the kit 150 will be described first and then the tools that may be assembled from the parts will be shown.

FIG. 1A is a plan view of the first bar 40 and FIG. 1B is an elevation view of the first bar 40. The first bar 40 has a threaded hole 42 in one end 44, a larger diameter threaded hole 46 in the other end 48 and a through hole 50 in the middle 52. The middle 52 also has a recess 54 and a flat 56 on each side of the recess 54. FIG. 1C is a plan view of the second bar 60 and FIG. 1D is an elevation view of the second bar 60. The second bar 60 has small diameter threaded holes 62 in each end 64 and a larger diameter threaded hole 66 in the middle 68. The middle 68 also has a recess 69.

FIG. 1E is a plan view and FIG. 1F is an elevation view of the suction cup 70. The suction cup 70 has a cup 72 made of resilient material such as synthetic rubber. The cup 70 has a cup side 74 and a side opposite 76. A threaded bolt 78 extends from the side opposite 76.

FIG. 1G is an elevation view and FIG. 1H is a plan view of the piston 80. The piston 80 has a knurled knob 82 at one end 84 and two O rings 86 that fit into annular grooves 88 in the other end 90. The middle 92 of the piston 80 has a larger diameter with threads 94.

FIG. 1J is an elevation view and FIG. 1K is a plan view of the cylinder 100 which has a knob 102 at one end 104 and threads 106 on the body. FIG. 1L is a view along the line 1L—1L in FIG. 1J showing a bore 108 with internal threads 110 in a larger diameter. The end 112 has an annular groove 114 into which the O ring 116 fits.

FIG. 1M is a plan view and fixture 1N is an elevation view of the bolt 120. The bolt 120 has a knob 122 and threads 124 on the end 126. FIG. 1P is a plan view and FIG. 1Q is an elevation view of the pressure bolt 130. The pressure bolt 130 has a knob 132 and threads 134 on the end 136. FIG. 1R is a plan view and FIG. 1S is an elevation view of the nut 140. The nut 140 has a knob 142 and internal threads 144 on the end 146.

Thus the kit 150 has the first bar 40, the second bar 60, the suction cup 70, the piston 80, the cylinder 100, the bolt 120, the pressure bolt 130, and the nut 140. The bolt 120, the pressure bolt 130 and the nut 140 may be made of a material such as nylon that will not scratch glass. The first bar 40, the second bar 60, the piston 80 and the cylinder 100 may be made of a light material such as aluminum or plastic. The bolt 78 may be made of a suitable material such as steel or aluminum.

The kit 150 may be assembled into several glass crack repair tools. One is the repair bridge 160 illustrated in the plan view of FIG. 2, the front elevation view of FIG. 3, the side elevation view of FIG. 4 and the bottom plan view of FIG. 5. The repair bridge 160 is constructed with the first bar 40 placed over the second bar 60 with the recess 54 of the first bar 40 placed against the recess 69 of the second bar 60 and secured with the bolt 120 which passes through the hole 50 in the first bar 40 and threads into the threaded hole 66 in the second bar 60. The first bar 40 is held substantially orthogonal to the second bar 60 by the flats 56 of the first bar 40 bearing against the sides of the recess 69 of the second bar 60.

The bolts 78 of two suction cups 70 are screwed into the threaded holes 62 of the second bar 60. The pressure bolt 130 is threaded into the threaded hole 42 of the first bar 40.

An injector assembly 152 is constructed by threading the piston 80 into the cylinder 100 so that the O rings 86 of the piston 80 are adjacent the O ring 116 of the cylinder 100 when the piston 80 is threaded all the way in. The injector assembly 152 is threaded into the larger diameter hole 46 of the first bar 40. The cup 72, the threaded end 136 of the pressure bolt 130, and the end 110 of the cylinder 100 all face the same direction relative to the first bar 40.

The repair bridge 160 may be held on a glass surface by the suction cups 70. If the cups 72 are coated with a means for lubrication such as petroleum jelly, the repair bridge may be slid along the glass surface. By rotating the pressure bolt 130 and the cylinder 100 towards the glass surface the O ring 116 of the cylinder 100 may be compressed against the glass surface. It may be appreciated that the piston may then be rotated towards the glass to create pressure in the bore 108 (FIG. 1L) of the cylinder 100 or may be rotated away from the glass to create a vacuum in the bore 108. When a vacuum is created in the bore 108, air will be pulled from a glass crack that is surrounded by the O ring 116. When a pressure is created in the bore 108, resin placed in the bore 108 will be forced into a glass crack that is surrounded by the O ring 116.

Figure 7:
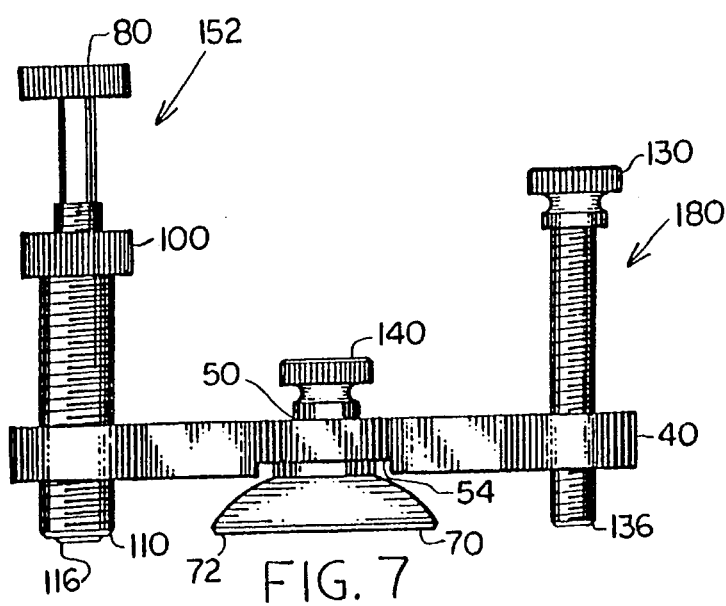
FIG. 7 is a front elevation view of the repair bar tool of FIG. 6.
Figure 8:
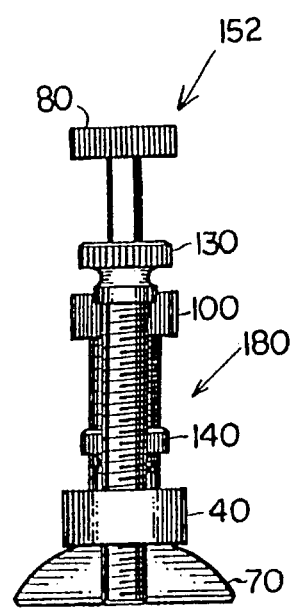
FIG. 8 is a side elevation view of the repair bar tool of FIG. 6.
Figure 9:
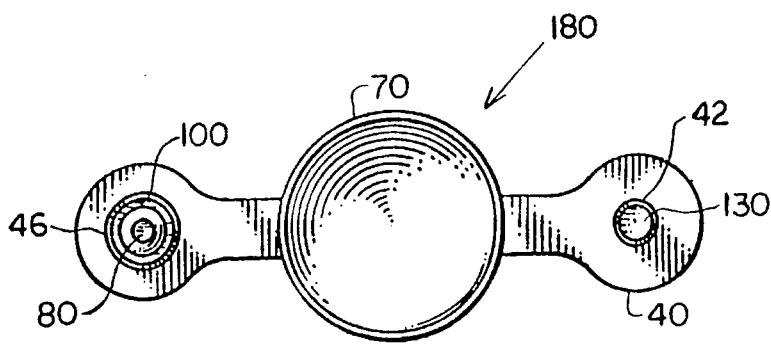
FIG. 9 is a bottom plan view of the repair bar tool of FIG. 6.

A second glass repair tool that may be assembled from the kit 150 is the repair bar 180 illustrated in the plan view of FIG. 6, the front elevation view of FIG. 7, the side elevation view of FIG. 8 and the bottom plan view of FIG. 9. The repair bar 180 construction begins with a suction cup 70 placed in the hole 50 and against the recess 54 of the first bar 40 and secured by threading the nut 140 over the bolt 78 (FIG. 1F) of the suction cup 70. The pressure bolt 130 is threaded into the threaded hole 42 of the first bar 40.

An injector assembly 152, assembled as described above for the assembly of the repair bridge 160, is integrated in the repair bar 180 by threading it into the larger diameter hole 46 of the first bar 40. The cup 72 of the suction cup 70, the threaded end 136 of the pressure bolt 130, and the end 110 of the cylinder 100 all face the same direction relative to the first bar 40. As described above for the repair bridge 160, the injector assembly 152 may be used to draw air from a crack surrounded by the O ring 116 or to insert resin, placed in the bore 108 (FIG. 1L), into the crack.

Figure 10:
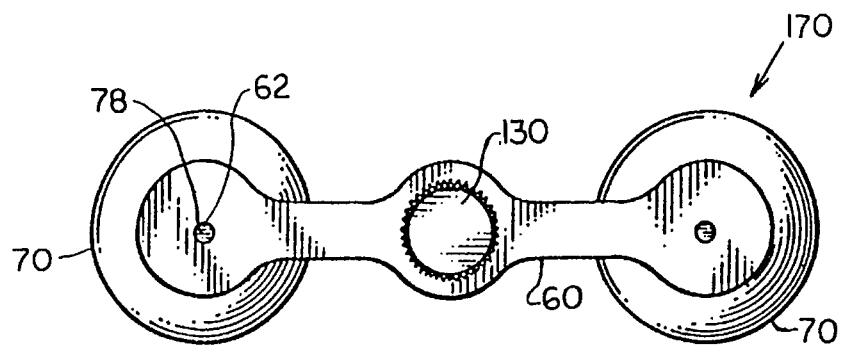
FIG. 10 is a plan view of a crack opener tool.
Figure 11:
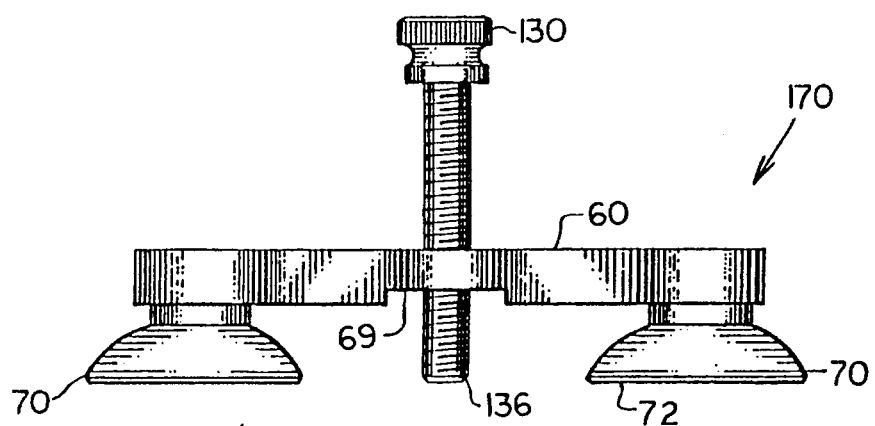
FIG. 11 is a front elevation view of the crack opener tool of FIG. 10.
Figure 12:
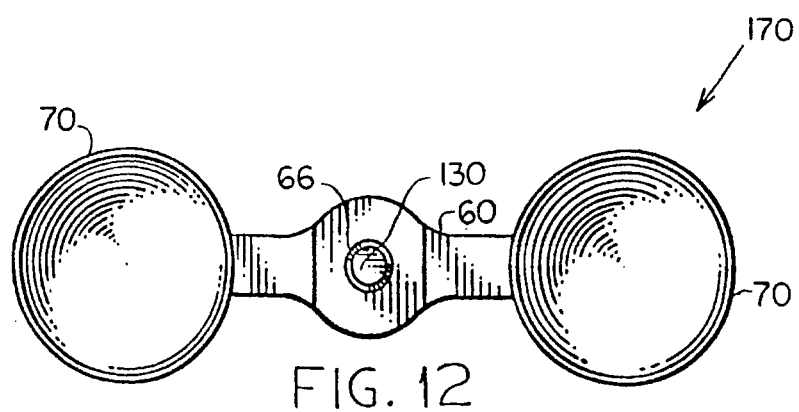
FIG. 12 is a bottom plan view of the crack opener tool of FIG. 10.

A third glass repair tool which may be assembled from the kit 150 is the crack spreader 170 as illustrated in the plan view of FIG. 10, the elevation view of FIG. 11 and the bottom plan view of FIG. 12. The bolt 78 (FIG. 1F) of a suction cup 70 is threaded into each of the threaded holes 62 of a second bar 60. A pressure bolt 130 is threaded into the threaded hole 66 of the second bar 70. The cups 72 of the suction cups 70 and the end 136 of the pressure bolt 130 face the same direction relative to the second bar 60. The recess 69 of the second bar 60 is shown in FIG. 11 to also face the same direction although this is optional.

The crack spreader 170 may be placed on the inside of a windshield with the suction cups 70 straddling the crack in the outer glass layer of the windshield. When the pressure bolt 130 is rotated so as to contact the glass surface with its end 136, the suction cups 70 resist by pulling on the inner glass layer and the crack in the outer layer is caused to spread apart. This allows easier flow of resin into the crack. The crack spreader 170 can be slid along the crack just in front of the injector.

Methods of use of the embodiment of the present invention are illustrated in FIGS. 13–21. Many of the methods of use concern the repair of a crack that starts at a point and runs either to the glass edge or to another point. If the crack does run to a point rather than to a bullseye it is advantageous to create a small bullseye at the point. This relieves strain on the point preventing further spreading of the crack and also provides an injection point for resin.

Figure 13:
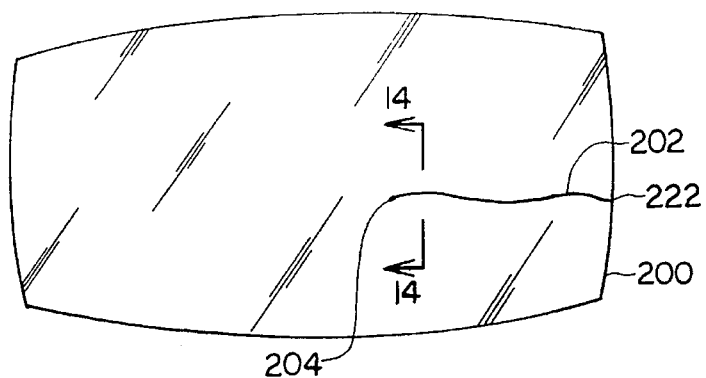
FIG. 13 is a perspective view of a windshield with a crack.

FIG. 13 and FIGS. 14A–D show the creation of a bullseye at a point. In the methods of use that follow, the words "tap a bullseye" or the like, will be understood to refer to this process. FIG. 13 illustrates a front view of a windshield 200 that has a crack 202 originating at a point 204 and running to the glass edge 222. To create a small bullseye at the point 204 the steps of FIG. 14A–D, which are a series of sectional views along the line 14—14 of FIG. 13, should be followed.

Figure 14A:
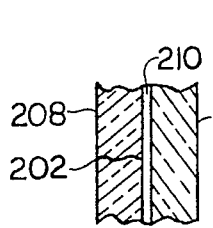
FIG. 14A–D are a series of sectional views along the line 14—14 of FIG. 13.
Figure 14B:
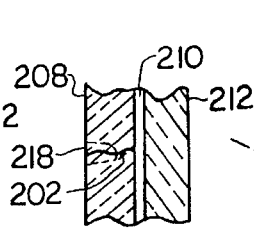
Figure 14C:
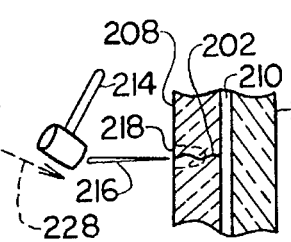
Figure 14D:
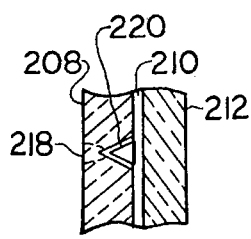

In FIG. 14A the crack 202 is seen in the outer glass layer 208. The inner glass layer 212 and the polybutyral layer 210 complete the section of the windshield. The first step to tap a bullseye is to drill a small hole 218 of diameter between one sixty fourth and one fourth of an inch in diameter approximately one half to three fourths of the way through the outer glass layer 208 as shown in FIG. 14B. Then a means for striking such as a small mallet 214 is used with a means for transferring force to a point such as a sewing machine needle 216. The needle 216 is placed in the hole 218 and tapped by swinging the mallet 214 in the direction 228 as shown in FIG. 14C. A razor blade holder may also be used for the means for striking. The result is shown in FIG. 1D where a small cone 220 of glass has been broken loose from the outer glass layer. Consequently a passageway in ensured through the outer glass layer 208 to enable the flow of resin into the crack.

Figure 15:
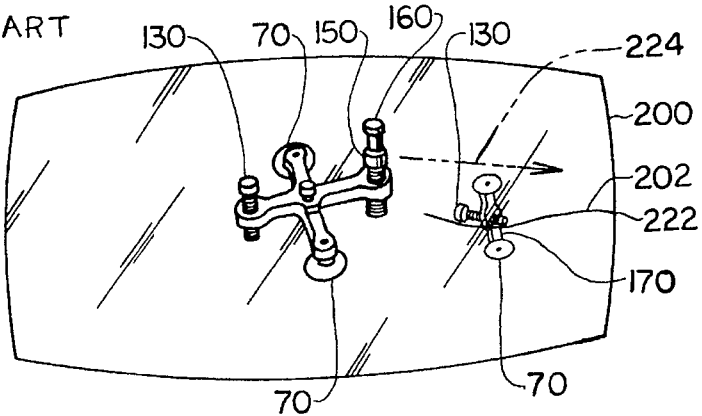
FIG. 15 is a perspective view of a method of filling a crack in a windshield.
Figure 16:
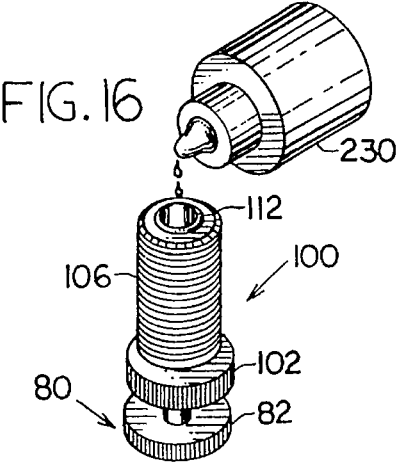
FIG. 16 illustrates the applying of means of lubrication to the vacuum cups of the repair bridge of FIG. 15.
Figure 17:
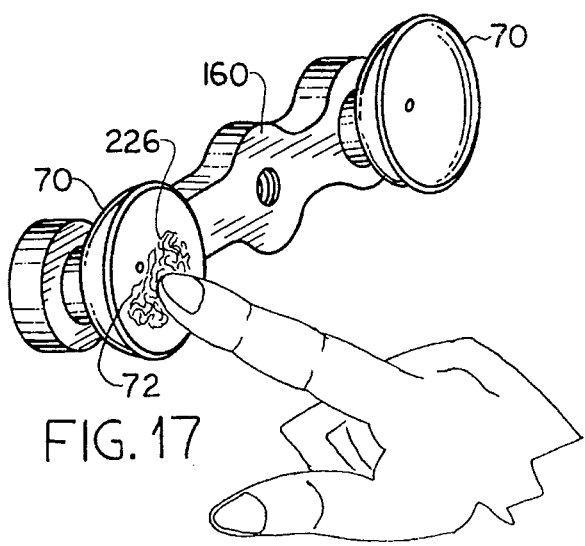
FIG. 17 illustrates the filling of the cylinder bore of FIG. 15 with resin.

FIG. 15 is a perspective view of the windshield 200 with the crack 202 running from a point (FIG. 13) to the glass edge 222. The first step in this method of crack repair is to tap a bullseye (as described above and shown in FIG. 14) at the point of the crack 202. The piston 80 is assembled with the cylinder 100 and resin 230 is then placed through the end 112 into the bore 108 of the cylinder 100 as shown in FIG. 16. The number of drops of resin 230 to use should be approximately the crack length in inches minus two. Means for lubrication such as petroleum jelly 226 is placed on the cup 72 of the suction cups 70 as illustrated in FIG. 17. The repair bridge 160 is then placed on the glass in FIG. 15 with the suction cups 70 compressed so as to hold the repair bridge 160 in place. The cylinder 100 and the pressure bolt 130 are both rotated downwards towards the glass until the O ring 116 (FIG. 1L) in the end of the cylinder 100 is compressed against the glass with the O ring 116 centered over the bullseye.

The piston 80 is then rotated away from the glass to create a vacuum in the bore 108 (FIG. 1L) which pulls the air out of the bullseye. The piston 80 is then rotated towards the glass and the pressure on the resin in the bore 108 causes the resin to flow into the bullseye and part way down the crack 202. Means for applying pressure such as the crack opener 170 is placed on the inside of the windshield 200. The pressure bolt 130 of the crack opener 170 is rotated towards the glass until it and the suction cups 70 of the crack opener 170 have applied enough force to open the crack slightly.

The repair bridge 160 and crack opener 170 may then be slid along the crack 202 in the direction 224 to the edge 222 keeping the O ring 116 centered over the crack 202. The crack 222 will fill with resin forced out of the bore 108 by the pressure exerted by the piston 80. The repair bridge 160 and the crack opener 130 are then removed from the glass.

Figure 18:
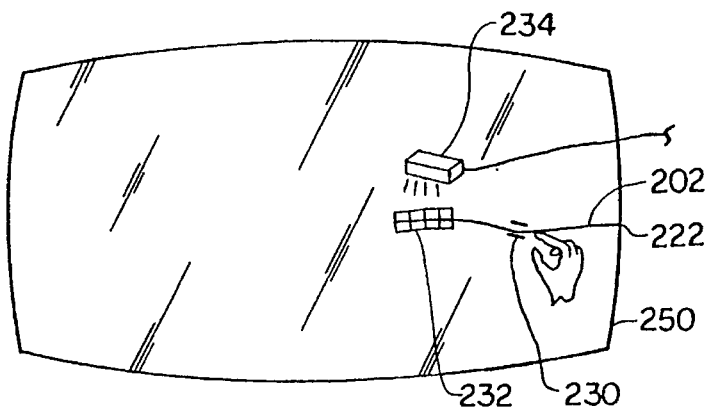
FIG. 18 is a perspective view of the applying of resin to a filled crack, placement of tabs and irradiation with ultraviolet light.

Resin 230 is then spread over the bullseye and the crack 202 as shown in FIG. 18, which is a perspective view of the windshield 200, and means for retaining the resin such as plastic tabs 232 are placed on the resin 230. The plastic tabs serve to keep air out of the crack and help it cure faster. Finally, the resin 230 is irradiated with ultraviolet light from an ultraviolet source 234 to cure it. The tabs 232 may then be removed and excess resin removed with a blade. Finally the glass may be cleaned with a glass cleaner being careful to not get cleaner on the fresh resin.

Figure 19:
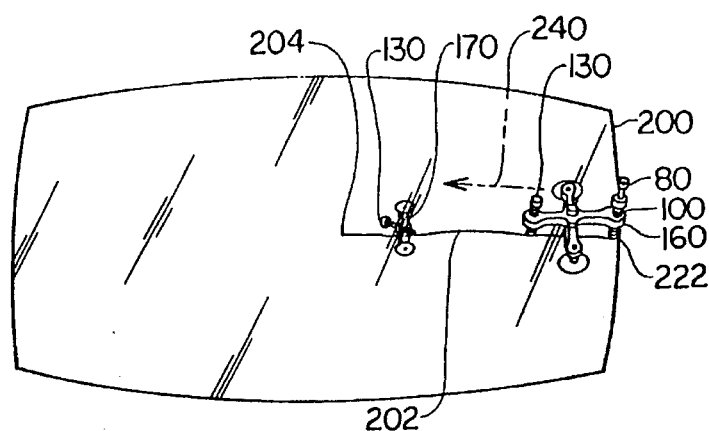
FIG. 19 is a perspective view of a second method of filling a crack in a windshield.

In FIG. 19 a second method of filling a crack 202 in a windshield 200 is illustrated. A crack opener 170 is placed on the inside of the windshield 200 one to four inches from the point 204. The pressure bolt 130 is rotated towards the glass until the crack is opened slightly. The suction cups 70 of a repair bridge 160 are coated with petroleum jelly as shown in FIG. 17. The piston 80 and cylinder 100 are assembled and resin 230 is placed in the end 112 of the bore 108 as shown in FIG. 16. The length of the crack in inches less two is the number of drops of resin 230 to use.

The repair bridge 160 is placed at the edge 222 of the crack 202 and the cylinder 100 and pressure bolt 130 turned towards the glass until the O ring 116 (FIG. 1L) is compressed against the glass and centered over the crack 202 at the edge 222. The piston 80 is turned towards the glass to create pressure on the resin in the bore 108. The repair bridge 160 is then slid along the crack 202 in the direction 240 keeping the O ring 116 centered over the crack 202 so as to fill the crack 202 with resin. Stop the repair bridge with the O ring 116 one to three inches from the point. The last part of the crack is the tightest and thus hardest to fill.

The repair bridge 160 and crack opener 170 are then removed from the glass. Resin 230 is then spread over the filled portion of the crack 202 as shown in FIG. 18 and plastic tabs 232 are placed on the resin 230. Finally, the resin 230 is irradiated with ultraviolet light from an ultraviolet source 234 to cure it.

A bullseye is tapped at the point 204 as described above and shown in FIGS. 14A–D. The repair bridge 160 is then placed on the glass as before but with the O ring 116 centered over the bullseye. The piston 80 is then rotated away from the glass to create a vacuum in the bore 108 (FIG. 1L) which pulls the air out of the bullseye. The piston 80 is then rotated towards the glass and the pressure on the resin in the bore 108 will cause the resin to flow into the bullseye and part way down the remaining portion of the crack 202.

The repair bridge 160 is then removed from the glass. Resin 230 is then spread over the bullseye and the remaining portion of the crack 202 and plastic tabs 232 are placed on the resin 230 as shown in FIG. 18. The resin 230 is irradiated with ultraviolet light from an ultraviolet source 234 to cure it. The tabs 232 may then be removed and excess resin removed with a blade. Finally the glass may be cleaned with a glass cleaner being careful to not get cleaner on the resin.

Figure 20:
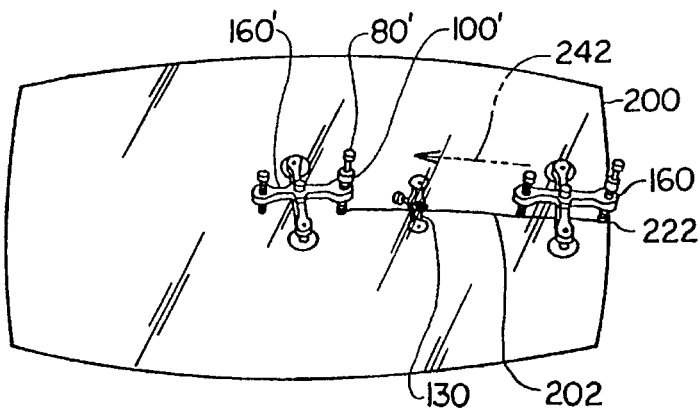
FIG. 20 is a perspective view of a third method of filling a crack in a windshield.

A third method of repairing glass cracks is illustrated in FIG. 20. It differs from the second method just described in that a bullseye is initially tapped at the point 204 of the crack 202 (FIG. 19). Then a second repair bridge 160' with resin 230 in the cylinder 100' (as in FIG. 16) is placed over the bullseye and the piston 80' is turned away from the glass to create a vacuum over the bullseye. The second repair bridge is left at the bullseye and the remainder of the repair proceeds as described above in the second method and as shown in FIG. 19. After the first repair bridge has been slid in the direction 242 to fill the crack 202 to within one to three inches of the bullseye, it is removed from the glass. The piston 80' of the second repair bridge 160' is turned towards the glass to create pressure on the resin 230 in the cylinder 100' which will cause the bullseye and the remaining portion of the crack 202 to fill with resin 230. The spreading of resin 230 over the filled crack and bullseye, placement of tabs 232, irradiation with an ultraviolet light source 234 and cleanup with a blade and window cleaner is as described for the second method and illustrated in FIG. 18.

Figure 21:
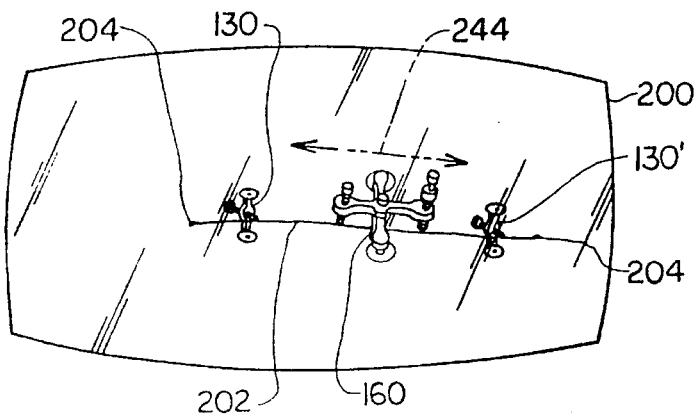
FIG. 21 is a perspective view of a fourth method of filling a crack in a windshield.

A fourth method of repairing a glass crack 202 in a windshield 200 is illustrated in FIG. 21. In this case the crack 202 runs from a point 204 to a second point 204'. Two crack openers 130 and 130' are placed on the inside of the glass one to four inches from each point to open the crack 202 in a method previously described. A repair bridge 160 is used along the direction 244 as previously described in the other methods to fill the crack to within one to three inches of each point 204, 204'. A bullseye is tapped at each point 204, 204'. The repair bridge 160 is then used to remove air from one bullseye and fill it with resin. This is repeated at the other bullseye. Covering with resin, placement of plastic tabs, radiation with ultraviolet light, and cleanup is as previously described for other methods and as shown in FIG. 18.

In the methods for filling glass cracks described above, means for applying pressure were used to spread the glass crack near the point of the crack to make it easier to inject resin into the crack. It was disclosed that a crack opener 170 as shown in FIG. 10 may be used. A repair bridge 160 (FIG. 2) may also be used as may the hands, thumb or fingers of the repair man. It helps, if using the hand or thumb to coat with means for lubrication, such as petroleum jelly so the pressure can be moved smoothly along the glass.

In the methods for filling glass cracks described above and, it should also be appreciated by those skilled in the art that the repair bar tool 180 (FIGS. 6, 7, 8 and 9) may be substituted for the repair bridge tool 160 (FIGS. 2, 3, 4 and 5) where desired. The repair bar tool 180 may also be substituted for one or both repair bridge tools 160 where two repair bridge tools 160, 160' were used, as in the third method shown in FIG. 20.

Resin 230 (FIG. 16) is available in a range of viscosities. In general as high a viscosity as possible should be used because the completed repair will be more likely to remain clear of spots and lines of refraction. High viscosity also keeps the repair from splitting apart due to temperature changes and stress. However, because it is hardest to get the resin to flow near the point of a crack, lower viscosity resin may be used there. The colder the climate, the higher the viscosity should be. When performing crack repairs in cold weather the glass must be warmed gradually before starting.

The cure time, which is the time during which the resin is irradiated with ultraviolet light, is five to seven minutes. If, after curing, a thin line of refraction appears, this can be resolved by drilling into the crack in the middle of this line and using the repair bridge 160 in both the vacuum and pressure mode to inject resin.

Sometimes the crack does not come to the surface of the glass. In those cases a hole should be drilled into the crack and a bullseye tapped. Then a repair bridge 160 may be placed over the bullseye in the pressure mode. Another hole is drilled three to four inches further down the crack and another bullseye tapped. Another repair bridge 160 or a repair bar 180 is placed over this bullseye in the vacuum mode. This will cause resin to flow from the first bullseye to the second. This process may be repeated down the crack to fill all of it.

Figure 23:
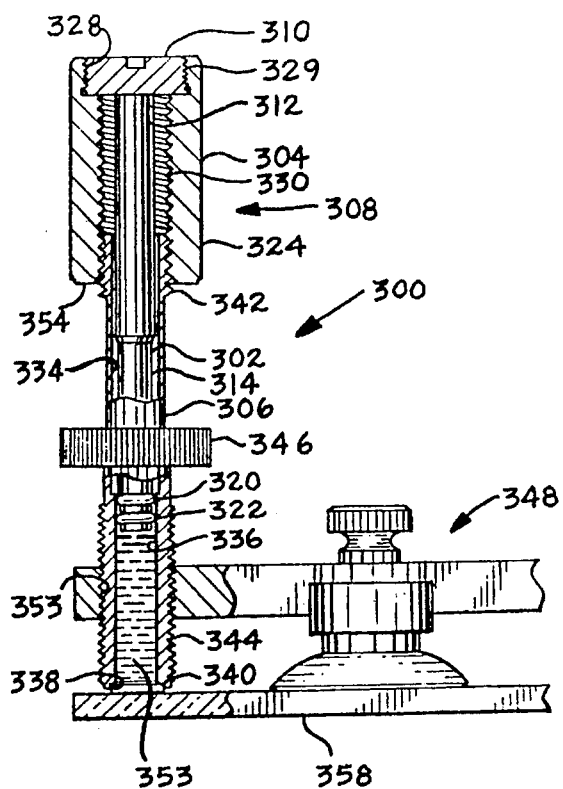
FIG. 23 is a view of the injector of FIG. 22 in use.
Figure 22:
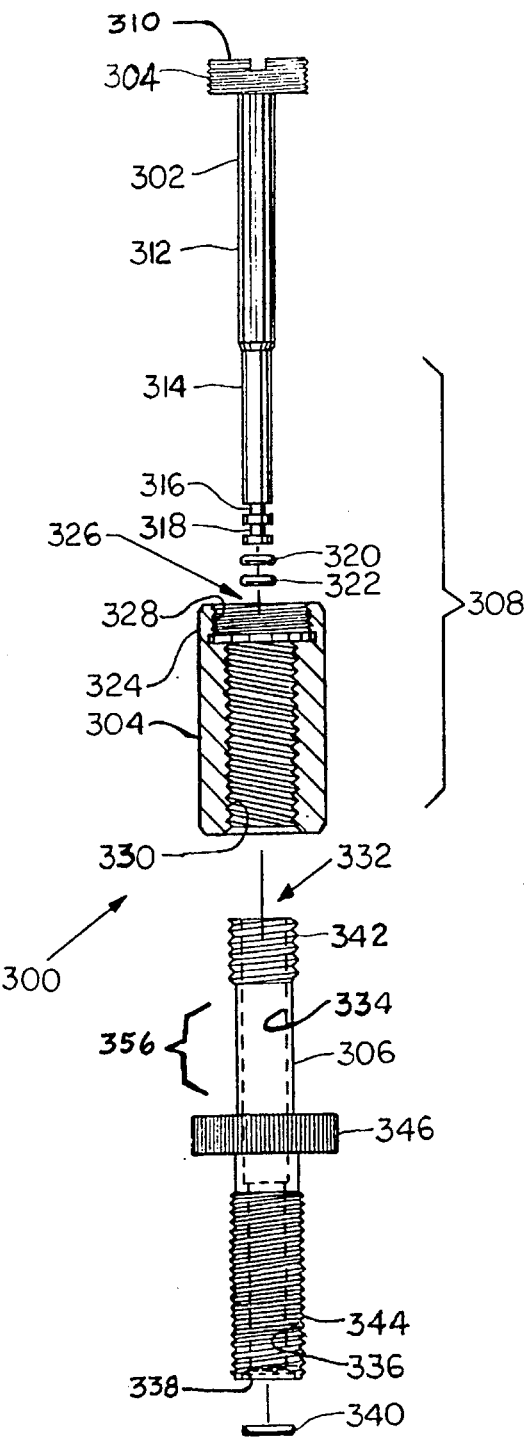
FIG. 22 is an exploded view of an injector for repairing long cracks.

FIG. 22 shows in an exploded view another embodiment of a piston cylinder injector; and FIG. 23 shows this embodiment installed for use in the second glass repair tool previously shown in FIGS. 6, 7, 8 and 9.

Referring to FIGS. 22 and 23 the injector 300 has three main parts, a piston 302, a piston cap 304 and a cylinder 306. When assembled for use, the piston 302 and the piston cap 304 become a single piston assembly 308 for use with the cylinder 306.

The piston 302 has an exterior threaded screw end 310, an upper shaft 312, a lower shaft 314, a first shouldered neck-down portion 316 and a second shouldered neck-down portion 318. Each neck-down portion 316 and 318 are adapted to receive O-ring seals 320 and 322 (FIG. 23) respectively as shown in FIG. 23.

The piston cap 304 is a cylinder having a knurled exterior 324 and a axial through-hole 326. At the upper end of the through-hole 326 are threads 328 which extend a relatively short length and are mateable with the threads 329 on the piston 302 so that together they become the piston assembly 308. The rest of the through-hole 326 has threads 330, of smaller diameter than threads 328.

The cylinder 306 has a through-hole 332 which may be a single bore size; but in this case has an upper bore 334 of larger diameter than the lower bore 336. The size of the lower bore 336 is set to provide good seal with the O-ring seals 320 and 322. The lower bore 334 defines a containment volume for resin as will be explained below. At the bottom opening of the lower bore 336 is a seal seat 338 in which is fitted an O-ring seal 340 as shown in FIG. 23. The exterior of the cylinder 306 has an upper threaded portion 342 which threadably mates with threads 330 in the piston cap 304; lower threads 344, and a knurled knob 346 which is about midway of the cylinder 306.

FIG. 23 shows the injector 300 mounted onto the tool 348 by threading the lower threads 344 into mating threads 358 in the tool 348. The tool 348 is the same as described above, but substituting the injector 300, for the injector previously described.

The injector 300 is generally used as described for the injector assembly 152 but with particular advantages for use in repairing long cracks. Prior injectors can hold about 1 cc of resin which is about 3 to 4 drops. However, the injector 300 has a capacity to hold in the containment volume of the lower bore 336 about 22 to 24 drops which is enough for a 24 inch crack. FIG. 23 shows the piston withdrawn to its uppermost position, providing the maximum containment volume 352 for resin 353. Also, in this position the upper thread 340 is just showing outside the bottom end 354 of the piston cap 302. This gives a visual signal to the user, of the uppermost position for withdrawal of the piston assembly 308 in the cylinder 306. Also, a series of marks as shown at 356 could be put in place on the outside surface of the cylinder 306 to visually indicate a withdrawal position sufficient to give a containment volume for selected amounts of resin consistent with repair of specified crack lengths such as 10 inches, 15 inches, 20 inches etc. Of course the skilled technician can use these marks as guidance for any length of crack within the capacity of the injector.

The knurled knob 346 is used to adjust placement of the O-ring seal 340 on the glass 358 for flatness and tight seal. After that adjustment, for repairing long cracks, the entire tool will be slid along the crack (being careful to avoid touching the crack with the suction cup) and the piston assembly 308 will be turned to inject resin to fill the crack as the sliding progresses. As the piston cap 304 exterior diameter can be quite large, very precise feel and control of the resin injection rate is possible.

In this construction the end of the lower portion of 314 of the piston, that is where the O-rings 320 and 322 are situated is a long distance from the area of the threaded mating of the threads 330 and 342. Therefore, with the tolerances allowed in the thread mating, the end of the piston has sufficient play or allowable movement that, when riding in the lower bore 336, the O-ring 320 and 322 can self-center. There are no forces tending to force the O-rings unsymmetrically against the wall of the lower bore 336. This will ensure the best seal and long life for the O-rings 320 and 322. In this case the threads 342 and 330 are ½–13 threads. This gives the desired play at the end of the piston 314. It also allows a convenient rate of injection of fluid as the piston assembly 308 is turned. Also, the engagement of threads 342 and 330 is fixed in length because the threads 342 has only a limited length. In this case threads 342 are 5–6 turns or rotations and threads 330 has about 17 turns or rotations. Thus the extent of engagement is fixed to the 5–6 thread turns of threads 342 and the force needed to turn the piston in or out is constant. Also, since threads 342 are on the outside of the piston 306, they are of relatively large diameter (½ inch) which allows a loose tolerance. There, the major resistance to turning is presented only by the fit of the O-rings 320 and 222 on the lower bore 336.

The threads 344 are finer, in this case ½–20. These threads need to hold tightly once set to the proper position so a thread of tighter engagement is needed. Also, a finer movement is needed to be able to set the injector tightly and flat against an item of glass to be repaired as shown in FIG. 23.

Therefore, the injector 300 can be used for both stone damage and long cracks. It will hold a large amount of resin when the piston assembly is backed full out as shown in FIG. 23. The tip of the lower piston shaft 314 is self centered due to the distance away of the threads 342 from the piston tip where the O-rings 320 and 322 are located and also because threads 342 are substantially larger in diameter than the diameter of the tip of the lower piston shaft 314 and are of relatively coarse, low tolerance threads. Therefore very little resistance to turning the piston assembly 308 is contributed by the thread engagement of threads 342 and 330, which in any case is constant. A greater but still constant resistance to turning is consistently contributed by engagement of the O-rings 320 and 322 on the lower bore 336.

The construction allows the outside surface 324 of the cap 304 to be as large diameter as desired, allowing precise control of the turning movement for resin injection. Therefore, with a minimum amount of training and experience an operator can inject resin uniformly into a crack while moving the tool along the crack, and at the same time precisely turning the piston assembly, to inject resin.

The knob 346 is also of relatively large diameter in order to allow precise turning of cylinder 306. However the knob 346 should be larger in diameter than the cap 340, for the reasons given below.

To use the injector 300, the piston assembly 308 is backed off to provide a resin containment volume of the desired volume. Holding the opening (where the seal seat 340 is) up, resin is inserted into the containment volume. Then the O-ring 340 is put in place and the piston assembly 308 rotated, if necessary, until the resin is at the O-ring 340. At this point there should be no air in the containment volume, only resin.

The tool 348 is already generally in place near the crack, and if used, a crack opener is in place. The injector 300 is threaded into the threads 358, the tool having been placed previously over the crack. The injector is rotated by knob 346 to be well scaled and flat on the glass. The larger diameter of knob 346, that is, larger than the diameter of the cap 304 enables easy adjustment without interference from the cap 304 and without disturbing the position of the cap 304.

When resin is being injected the cap 304 is turned the bottom 354 of the cap 304 will hit the knob 346, to prevent further travel of the lower piston shaft 314 when it is just short of projecting beyond the end of the through hole 332, that is, just at or short of the seal seat 338.

In use for long cracks, it is preferred to use only the bar shaped single suction cup supporting tool of FIGS. 6, 7, 8 and 9, rather than the double suction cup tool of FIGS. 2, 3, 4 and 5. This gives better control for smooth even sliding along the crack, with one hand, while turning the cap 304 with the other hand; thereby resulting in a well controlled volume of resin injection to just, but fully, fill a crack. The crack may vary in width, thus requiring variable rate of injection, but preferably with constant rate of sliding over the crack. Therefore, the present tool and injector combination allow the precise smooth action both in sliding and rate of injection. Also, the single suction cup will have less pull on the glass; too much pull can move the glass, which is detrimental to a good result.

If more pressure is needed the knob 346 can be turned easily to provide it.

Also, this injector 300 can be operated alone, without a supporting tool by holding it firmly in place and sliding, with one hand, and turning the cap 304 with the other hand.

As stated above, for best repair of long cracks, that is surfaced cracks, it is best to use the thickest, that is the highest viscosity resin which can be employed. Also, in a colder climate viscosity should be higher than would be used in a warmer climate.

Therefore in a moderate climate for cracks of increasing openness, the resin viscosity may extend in a range from about 60 c.p.s. to about 1,500 c.p.s. In a cold climate for cracks of increasing openness, the resin viscosity may extend in a range from about 60 c.p.s. to 4,000 c.p.s. The reason for this is that the higher the viscosity in most resins (e.g. aerobic, two-part and U.V.) the greater will be the holding power. This holding power is needed with windshields during thermal expansion and contraction cycles. Warming of the resin for the injection procedure will make injection easier.

Holding power refers to adhesion of the resin to the glass as well as to the internal strength and elasticity of the resin. After curing a thicker (higher viscosity) resin gives a more clear even appearance with less possibility for air spots being formed during injection.

The choice of viscosity varies with climate, length of crack and location of crack on a windshield. Following are some examples:

EXAMPLE #1

Climate: Southern California
Length: About 12 inches or less
Location: Side of windshield
Resin: At the point, as low as about 40 c.p.s. Remainder about 60 c.p.s.

EXAMPLE #2

Climate: Southern California
Length: About 18 inches
Location: Side of windshield
Resin: At the point, about 60 c.p.s. Remainder about 90 c.p.s.

EXAMPLE #3

Climate: Southern California
Length: About 18 inches
Location: Bottom of windshield
Resin: At the point, about 60 c.p.s. Near the edge, about 1,500 c.p.s. Intermediate area about 500 c.p.s.

EXAMPLE #4

Climate: Chicago (i.e. cold winter)
Length: About 12 inches
Location: Side of windshield
Resin: At the point, about 60 c.p.s. Remainder about at least 150 c.p.s.

EXAMPLE #5

Climate: Chicago (i.e. cold winter)
Length: About 18 inches
Location: Side of windshield
Resin: At the point, about 60 c.p.s. Remainder about at least 1,200 c.p.s.

EXAMPLE #6

Climate: Chicago (i.e. cold winter)
Length: About 18 inches
Location: Bottom of windshield
Resin: Near the edge, about 3,000 c.p.s. Intermediate, about 1,200 c.p.s. At the point about 60 c.p.s.

Further investigation has resulted in additional discoveries respecting the use and choice of resins in various conditions and methods of repairing cracks using various resins.

In part the additional invention resides in discovering and defining the various modes and types of failure, in considering the needs and capabilities of workers in the field to be able to effectively made good, lasting repairs and in determining the controlling resin variable or variables in making effective repairs in long cracks.

In particular, although it has been determined that use of the highest possible viscosity of resin is desirable in each portion of the repair in order to ensure the greatest integrity of the repair, there are disadvantages to this procedure. In particular, high viscosity resins are more difficult to use. Also, it should be appreciated that the walls of the glass in a crack have small crevices, pits and similar discontinuities. Ultimately at very high viscosity, the flow resistance causes the resin to fail to fill all these crevices and pits and therefore establish an incomplete adhesion in which integrity of the bond is compromised between the resin and the crack wall is compromised. Therefore, within the notion that higher viscosity resin should be used in the open part of the crack it is desirable to find the lowest viscosity which will be effective. In the investigation necessary for the present invention, it was necessary to define the various types and portions of cracks, and to define the difference between success and failure in a repaired crack.

As noted above, long cracks (over 6 inches in length) have a surfaced portion which is repaired by progressive insertion of resin from the surface, also referred to as sliding surface injection of resin. Most such long cracks extend to the edge of the windshield. The crack is widest nearer to the edge of the windshield and is narrower as it progresses to a point in the glass area. Also, a crack that proceeds to the edge will be substantially wider than an equivalent length crack which does not. Also, the longer the crack, the wider it is at the extreme open end.

Cracks appear in different parts of the windshield, and the position of the crack will effect the repair requirements. In particular a crack that ends at the bottom of the windshield is more problematic because it is subject to greater vibration and change in gap due to temperature cycling such as when the defroster is in use. Cracks at the side and top are less problematic.

Figure 24:
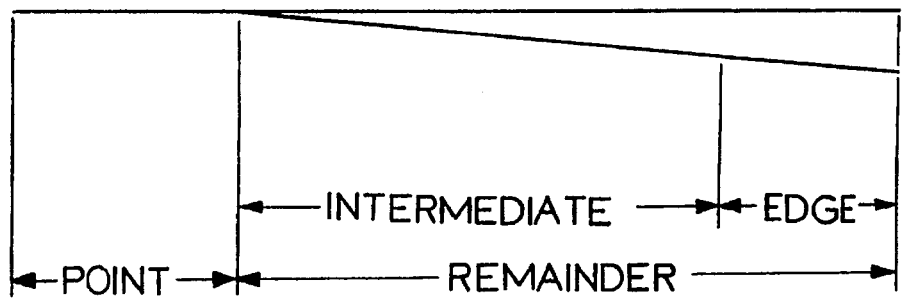
FIG. 24 shows schematically a crack of the type under consideration.

The elements of a crack are defined as a point portion and a remainder portion and within the reminder portion an edge portion and an intermediate portion. FIG. 24 shows schematically a crack of the type under consideration. This shows the point portion, the remainder portion, the edge portion, and the intermediate portion. Because of the way windshields are curved and stressed especially in the curved portion of the glass, the crack is much wider at the edge and 95% (a rough estimate) of all cracks over 6" in length will run to the edge. In fact when observed, a crack which proceeds to the edge will make a crackling or clicking sound and can be seen when magnified to open substantially when the crack reaches the edge.

The point portion terminates in the glass area and is either unsurfaced or very tight. The point portion is, in general, that portion which standing alone would fall within the scope of "stone damage" and would be repairable with stone damage art as described previously.

Most of the time in a long crack the impact point will appear in the remainder portion. If the impact point is a bullseye, star or combination, that portion will be repaired by stone damage pressure techniques, such as point pressure injection. Often the impact point will be very small, such as the size of a pin head, and can be ignored.

While the flow of resin into the point portion will normally be accomplished by point pressure injection into a passageway and thence along the crack interior, in some cases the point portion can be filled by sliding surface injection. For example, if the viscosity of the selected resin is very thin such as 10–20 c.p.s. it may flow into even a tight surfaced crack. Or, if the crack is flexed from inside the windshield an unsurfaced crack may surface and open and a tight surfaced crack may open enough for sliding surface injection of a thin resin. Sliding surface injection is easier than point pressure injection if the right tools are used.

The remainder portion of the crack is surfaced, and is relatively wider than the point portion presenting sufficient gap that it is repairable by sliding surface injection. The remainder portion is typically in that part of the crack which extends from the point portion to the edge of the glass. These typical forms are described but cracks can take many different forms. However, it is normally expected to see a point portion and a remainder portion in a crack over 6 inches in length. When a crack goes to the windshield edge it opens much more than when it does not, and therefore it is useful to define the intermediate portion and the edge portion of the remainder portion. The intermediate portion extends between the point portion and the edge portion. The edge portion extends to the edge of the windshield. The edge portion will be substantially wider than the intermediate portion. In a 12 to 18 inch crack it would be expected that the edge portion would extend 1 to 6 inches in length depending on the crack location and configuration. Although these definitions are imprecise, in application to a particular crack, there are consistent features to be seen. The point portion is defined above. The intermediate portion has a gap of not unusual width. The edge portion is noticeably wider. In some cases there will be little or no intermediate portion; in other cases the edge portion may be of not unusual width. Defining these portions is important to aid the technician in recognizing them so as to analyze the crack and determine the optimal repair procedure. The definitions are also important in order to specify the process.

It has been found that faults in a long crack repair can be characterized as follows:

Separation. This is separation of the resin from the plastic layer at the bottom of the crack. Separation will appear as refraction in the form of short spots or longer lengths (sometimes called a "runner"). Separation can occur immediately such as during curing of the resin, or it may occur within a few days. In the latter case it is considered a form of deterioration as noted below. Immediate separation is normally repaired immediately as part of the initial repair.

Deterioration. In this form the fault appears either in the body of the resin or by detachment of the resin from the crack either at the sides where it adheres to the glass or the bottom where it adheres to the plastic laminate. The resin will pull apart or will be pulled away from its adhesion to the glass in the crack or pieces of resin may come off the exterior surface of the resin may be damaged. Also later separation is a form of deterioration. Deterioration is a later effect which occurs after the repair is completed, usually due to physical disturbance of the resin. It may occur gradually. The most common cause of deterioration is thermal expansion and contraction of the windshield. Physical affects such as windshield wiper, dirt accumulation, ice or frost or ice scraping or vibration or flexing of the windshield are also causes of deterioration. Two types of deterioration were observed. Edge deterioration appears commencing at the edge of the glass inward and is characterized by resin pulled out of adhesion to the glass, splitting apart of the resin body. Top surface deterioration is where the surface of the resin is jagged or galled, possibly small pieces missing, and spots of refraction appear.

It should be noted that if there is dirt in a crack, edge deterioration is more likely, therefore mixed results in a plurality of tests could be associated with occasional dirty cracks.

Failure. In this fault, after the repair, the crack itself extends further than originally, past the terminal end of the point portion into new glass area. This is a later effect. A crack which "holds" is one which did not fail.

As for the length of the crack, in theory any length crack can be repaired. The bonding strength of the resin will be sufficient to restore the windshield. But, it has been found that when a crack exceeds 18 inches, a different set of problems often appear. Such long cracks are often the result of extension of an older shorter crack. Consequently, such a crack will be dirty, due to its age, and repair is not recommended unless sufficient cleaning of the crack can be ensured, or if it is relatively new and clean. Cleaning can be done by injecting a cleaning solvent into the crack and blowing it out with compressed air.

In general the primary factors to be considered in choosing the resins to be used in a crack repair are the immediate and the lasting quality of the repair. The immediate quality concern is basically how the repair looks after it is finished, that is that the crack be completely filled with resin leaving no air gaps or bubbles. The resin must be in complete contact with the sides and bottom of the crack. There must be no bubbles in the resin itself. Overall the goal is to eliminate any refraction surfaces to minimize or eliminate light refraction. As noted above separation can be an immediate quality factor because it can occur as early as during curing or shortly thereafter. This concern is effected by the flow quality of the resin, that is its viscosity, the tools used, and the operator's skill.

The lasting quality concern is that a well executed repair remain so. It has been found that the mechanisms for poor lasting quality can be characterized as separation, deterioration and failure as defined above.

The characteristics of resins which are known to purchase are: adhesion strength, tensile strength, and viscosity. Resins are also characterized by a manufacturer as being adhesive type or structural adhesive type. It has been determined by the test and examples herein that viscosity can sufficiently define the desired quality of the resin to accomplish effective repairs.

The appropriate viscosity in terms of immediate quality of repair is relatively easy to ascertain, it is a viscosity that can be easily inserted, will flow smoothly and readily, will enter the crack readily and will fully fill the crack including the pits and its crevices.

But, the lasting quality concerns are less easily apparent. Although it is appreciated as noted above that the highest viscosity possible should be used in various portions of a crack, in order to ensure an effective repair, there is a disadvantage in this applying this conclusion. Quite high viscosities are available. But the severe resistance to flow and consequent unpredictability of flow confronts the varying skills of the operating technicians and the capabilities of the equipment used to inject the resin. Thus it is desirable to use not the highest viscosity resin available or even which is flowable into the crack, but rather the lowest viscosity which will still provide an effective repair.

The point portion will still employ the stone damage techniques of the past, using very thin resins to enable flow into an access passageway such as an impact point or drilled access passageway, or to flow into a tight but surfaced portion. The highest viscosity which can be used in the point at room temperature is usually about 80 c.p.s. with some difficulty. 40–60 c.p.s. works best for ease of use and 90–100 c.p.s. can usually only be used in temperatures exceeding 85° F. 40–60 c.p.s. will hold and will not deteriorate in the point section. Under 40 c.p.s. will have separation from the lamination too often. 40–80 c.p.s. is recommended with 40–60 c.p.s. being the easiest. A series of tests were conducted. The test data and results are shown in Table I, and are described below.

TABLE I

| VISCOSITY C.P.S. | ADHESIVE P.S.I. | TENSILE P.S.I. | SEPARATION | DETERIORATION EDGE/TOP** | FAILURE IN SO. CALIF. | FAILURE IN FOUR SEASON CLIMATE |
|---|---|---|---|---|---|---|
| 10 | 1500 | 7000 | YES | YES/YES | YES | PRESUMED |
| 10–15 | 1850 | 2100 | YES | YES/YES | YES | PRESUMED |
| 15–20 | 1800 | 2000 | YES | YES/YES | YES | PRESUMED |
| 20 | 1500 | 10000 | YES | YES/YES | YES | YES |
| 40 | 1500 | 10000 | YES | YES/YES | YES | YES |
| 40 | 1800 | 2800 | YES | YES/YES | YES/NO* | YES |
| 60 | 1500 | 10000 | YES | YES/YES | YES/NO* | YES |
| 80 | 1500 | 6600 | YES | YES/YES | YES/NO* | YES |
| 100 | 1800 | 2800 | YES | YES/YES | NO | NO |
| 120 | 1500 | 2700 | YES | YES/YES | YES | YES |
| 150 | 1500 | 10000 | NO | SLIGHT/SLIGHT | NO | NO |
| 200 | 1500 | 4000 | NO | NO/VERY SLIGHT | NO | NO |
| 300 | 1500 | 4000 | NO | NO/NO | NO | NO |
| 400 | 1500 | 4000 | NO | NO/NO | NO | NO |
| 500 | 1500 | 4000 | NO | NO/NO | NO | NO |
| 600 | 1500 | 4000 | NO | NO/NO | NO | NO |
| 800 | 1500 | 4000 | NO | NO/NO | NO | NO |

TABLE I-continued

| VISCOSITY C.P.S. | ADHESIVE P.S.I. | TENSILE P.S.I. | SEPARATION | DETERIORATION EDGE/TOP** | FAILURE IN SO. CALIF. | FAILURE IN FOUR SEASON CLIMATE |
|---|---|---|---|---|---|---|
| 1000 | 1500 | 10000 | NO | NO/NO | NO | NO |
| 1200 | 1500 | 10000 | NO | NO/NO | NO | NO |
| 1500 | 1500 | 12000 | NO | NO/NO | NO | NO |
| 1800 | 3000 | 4000 | NO | NO/NO | NO | NO |
| 3600 | 2500 | 5200 | NO | NO/NO | NO | NO |
| 4000 | 4000 | 6000 | NO | NO | NO | NO |

** EDGE means at the edge of the glass TOP means at the top surface of resin
*YES/NO — HELD CRACKS FROM THE TOP AND SIDES BUT NOT OFF THE BOTTOM OR FAILED WHEN THERE WAS A FROST OR DEFROSTER USE.

The table records viscosity of resin as specified by manufacturers which is understood to be specified at room temperature. Some of the resins were prepared by mixing other compatible resins to arrive at a desired viscosity. The table also records adhesive strength and tensile strength of resins. Repaired windshields were examined at least three months after repair. The table records the presence or absence of various faults:

Separation.

Deterioration of the resin at the edge portion of the crack and at the top surface of the resin.

Failure in Southern California—repairs were done at room temperature or above and vehicles operated in Southern California.

Failure in Four Season—repairs were done at below room temperature and vehicles were operated in cold climate.

It is generally considered that higher viscosity resins will have a higher tensile strength, but this is not the case as can be seen in the Table I in which for example 20 c.p.s. and 40 c.p.s. samples had a 10,000 p.s.i. tensile. In any case the test data shows that tensile strength is not consistently variable in deterioration of repairs although it appears to have some effect and may be relevant. But, for purposes of determining the choice of resin, the tests confirm that viscosity is consistently the controlling specification. The 20 c.p.s. viscosity resin with a tensile strength of 10,000 p.s.i. and 1,500 p.s.i. adhesion strength would not hold while a resin of 800 c.p.s. viscosity 4,000 p.s.i. tensile strength and 1,500 p.s.i. adhesive strength did hold and also did not deteriorate. Also, the 100 c.p.s. resin having 2,800 p.s.i. tensile deteriorated. The 150 c.p.s. resin with 10,000 p.s.i. deteriorated slightly; at 200 c.p.s. the result improved to an acceptable level and at 300 c.p.s. there was no deterioration. The tests demonstrate that viscosity is the primary controlling quality to be considered in choosing resins for use in the remainder portion of a long crack. However, when the viscosity is raised the repair is better regardless of the slight adhesion strength variation. This interpretation relies on the 100 c.p.s., 120 c.p.s. and 150 c.p.s. samples. Long term observation has lead to the conclusion that the 120 c.p.s. samples were possibly flawed. However, an alternative conclusion is that 2,800 p.s.i. is the minimum acceptable tensile strength and that the 2,700 p.s.i. tensile is too low. However, the minimum tensile should be 2,800 p.s.i. or higher.

The minimum viscosity that will hold in the remainder portion is 90 to 100 c.p.s. But this viscosity resin results in deterioration.

At 200 c.p.s. viscosity the resin held in the four season climate and in Southern California, and is satisfactory in deterioration performance showing only very slight deterioration over time. Thus 200 c.p.s. is the minimum satisfactory viscosity for all fault conditions.

At 300 c.p.s. even the slight deterioration was gone and therefore 300 c.p.s. is considered the optimum low end of the range for the remainder portion of a repair for all fault conditions.

In another test resins of 1,500 and 1,200, 1,000 and 800 c.p.s. were used in an outside repair when the ambient temperature and the windshield were substantially below room temperature. In this case the 1,500 c.p.s. and the 1,200 c.p.s. samples failed quickly but the 800 c.p.s and 1,000 c.p.s. sample did not fail and did not deteriorate. Therefore when working in an environment below room temperature the resin viscosity should be 1,000 c.p.s. but not lower than 100 c.p.s. Resins higher than 1,000 c.p.s. when cold will not flow into the pits and crevices and the bond will be compromised. A premise of the tests is that a four season climate presents the most problematical circumstance and that failure or deterioration in Southern California implies that failure or deterioration would occur in a four season climate. But, non-failure in Southern California is not indicative of the failure potential in a four season climate. Deterioration observations in Southern California and in a four season climate were consistent.

Room Temperature is a commonly used reference understood to mean that temperature at which a room will be comfortable for human occupation. A temperature between 68° F. and about 76° F. is generally the range considered to be room temperature. By contrast, in the present context references to environment below room temperature means about 65° F. and lower although a lower limit of this range is suggested by a limit of human comfort and adverse effects on the resin. While these are not precise definitions it is important to distinguish the line below room temperature as substantially affecting the viscosity of a resin, such that the manufacturer's specified viscosity as at room temperature is no longer applicable and the viscosity increases to the extent that the crack is not properly filled.

The business of windshield repair must be also considered. This business is operated by entrepreneurs or others whose training and skill is often modest. The repair technician typically buys tools and resins from a windshield repair supplier such as Ultra-Bond Inc. of Riverside Calif. The resins are not supplied in fine gradations of viscosity, rather a typical set of resins may contain 4–8 different resins. Also, to be successful, a technician must be able to do repairs outside at the customer's location. Temperatures lower than room temperature have greater impact on the potential for problems than do temperatures at or higher than room temperature. In other words operations in a four season climate present the greatest potential for problems, both because of the problems presented during the repair and the impact of wide temperature variations after the repair is made.

The conclusion is that the all season range of viscosities for use in the remainder portion of a crack is above about 100 c.p.s. and below about 1,000 c.p.s.

When limited to use at room ambient temperature, the upper range limitation can be ignored and resins above 1,000 c.p.s. can be used. Resins up to 20,000 c.p.s. have been successfully used. As noted above, under these conditions, the general rule of highest viscosity possible is applicable as long as it flows and completely fills the crack and its pits and crevices.

But, when operating in a substantially lower than room ambient temperatures environment, the 1,000 c.p.s. viscosity and lower should be observed.

It should be appreciated that reference to choice of resin viscosity refers to viscosity specified by the manufacturer which is understood to be measured at room temperature. A colder ambient temperature will effect the viscosity, raising it, while a warmer ambient temperature will lower the viscosity. A good rule of thumb is that viscosity will reduce by about ½ at about 100° F.–110° F. and it should not be heated more than about 115° F.

Another variable in methodology is heating the windshield, injector and/or the resins when the ambient temperature is cold. This will enhance flow by reducing the viscosity of the resin temporarily thereby ensuring good crack filling and good adhesion. Enhancing flow is not always desirable, a thick resin not only works better in a wide crack, but fills the crack better than a thin resin. If it is made too thin, it may not fill or stay in the crack prior to curing. Thus the resin flow characteristics should be such that it can be readily inserted into the crack, will flow into tiny pits and crevices and will stay in place until cured. As noted herein, beyond those flow characteristics, the resistance to deterioration and failure also enter into the choice of resin.

For case of repair a minimum of two resins is preferred. For example a 1,000 c.p.s. resin at the edge and through the entire remainder portion and a 40 c.p.s. resin in the point portion. On a crack with wide variations in width three resins could be used, for example a 4,000 c.p.s. resin in the edge portion, a 300 c.p.s. resin in the intermediate portion and a 40 c.p.s. resin in the point portion. Theoretically, many gradations could be used, but as pointed out above practical considerations, skill of the technician, time, type of tool used, and the temperature of the environment in which the repair is conducted urge limiting the number of resins in a particular crack. It is considered that a resin which is not successful in Southern California will not be successful in a four season climate. On the other hand the four season climate presents the greatest challenge.

What is claimed is:

1. A method of repairing a crack in a windshield having two layers of glass and a plastic layer between the two glass layers and each glass layer having a periphery defining a glass area having an outer surface within the periphery and having at least one edge joining the glass area at the periphery, the crack being in one layer and being over six inches in length and having a first end within the glass area and a second end either within the glass area or at the edge of the glass and having a length of the crack which is surfaced or open defining a reminder portion and a length of the crack which is unsurfaced or tight defining an effectively unsurfaced portion comprising;

inserting a first resin having a preselected viscosity into the effectively unsurfaced portion of the crack;

inserting a second resin having a viscosity which is higher than that of the first resin, into the remainder portion of the crack by progressively injecting said second resin along the surfaced length of the crack; and causing the resin to cure;

wherein the first resin has a viscosity up to about 100 c.p.s. and the second resin has a viscosity at least about 150 c.p.s.

2. The method of claim 1 wherein the second resin has a viscosity of at least about 200 c.p.s.

3. The method of claim 2 wherein the remainder portion of the crack extends to the edge of the glass area.

4. The method of claim 1 wherein the remainder portion of the crack extends to the edge of the glass area.

* * * * *